United States Patent
Lauzon et al.

(10) Patent No.: US 10,766,211 B2
(45) Date of Patent: Sep. 8, 2020

(54) METHOD OF FORMING PRESSURE PAD OR OTHER FLEXIBLE ELEMENT FOR USE DURING CURE OF COMPOSITE MATERIALS

(71) Applicants: Bell Helicopter Textron Inc., Fort Worth, TX (US); National Research Council of Canada, Ottawa (CA)

(72) Inventors: Marc Lauzon, Saint-Colomban (CA); Patrick Dupré, Roxboro (CA); Marc-André Octeau, Laval (CA); Pascal Forget, Saint-Jérôme (CA); Steven Roy, Montreal (CA)

(73) Assignees: Textron Innovations Inc., Providence, RI (US); National Research Council of Canada, Ottawa (CA)

( * ) Notice: Subject to any disclaimer, the term of this patent is extended or adjusted under 35 U.S.C. 154(b) by 0 days.

(21) Appl. No.: 15/264,136

(22) Filed: Sep. 13, 2016

(65) Prior Publication Data
US 2017/0225409 A1 Aug. 10, 2017

Related U.S. Application Data

(60) Provisional application No. 62/218,286, filed on Sep. 14, 2015.

(51) Int. Cl.
*B29C 70/44* (2006.01)
*B29C 33/38* (2006.01)
(Continued)

(52) U.S. Cl.
CPC ........ *B29C 70/443* (2013.01); *B29C 33/3842* (2013.01); *B29C 70/10* (2013.01);
(Continued)

(58) Field of Classification Search
CPC ........ B29C 70/443; B29C 70/48; B29C 70/56
(Continued)

(56) References Cited

U.S. PATENT DOCUMENTS 4,548,859 A * 10/1985 Kline .................... B29C 37/006
427/243
5,114,637 A * 5/1992 Williams ................ B29C 39/32
264/101
(Continued)

FOREIGN PATENT DOCUMENTS

CA 2675801 A1 7/2008
CA 2811292 A1 3/2011
(Continued)

OTHER PUBLICATIONS

Black. "Reusable vacuum membrane: Coming of age?" Available Nov. 30, 2013.*
(Continued)

*Primary Examiner* — Matthew J Daniels
*Assistant Examiner* — Hana C Page
(74) *Attorney, Agent, or Firm* — Lightfoot & Alford PLLC

(57) ABSTRACT

A method of manufacturing a flexible element configured for pressing against composite material received on a mold surface of a mold during cure, including placing a porous material over the mold surface, forming a sealed enclosure containing the mold surface and the porous material, infusing a curable liquid material such as silicone in liquid form into the enclosure under vacuum and through the porous material, curing the liquid material to form the flexible element, and opening the enclosure and disengaging the flexible element from the mold. In a particular embodiment, the flexible element is a pressure pad.

20 Claims, 10 Drawing Sheets

(51) Int. Cl.
*B29C 70/10* (2006.01)
*B29L 31/30* (2006.01)
*B29K 83/00* (2006.01)
*B29C 70/54* (2006.01)
*B29K 105/04* (2006.01)
*B29K 267/00* (2006.01)

(52) U.S. Cl.
CPC ........ *B29C 70/547* (2013.01); *B29K 2083/00* (2013.01); *B29K 2083/005* (2013.01); *B29K 2105/04* (2013.01); *B29K 2267/00* (2013.01); *B29K 2313/00* (2013.01); *B29L 2031/3055* (2013.01); *B29L 2031/3076* (2013.01); *B29L 2031/3082* (2013.01); *B29L 2031/3085* (2013.01); *B29L 2031/3088* (2013.01)

(58) Field of Classification Search
USPC .......................................................... 264/571
See application file for complete search history.

(56) References Cited

U.S. PATENT DOCUMENTS

| | | | |
|---|---|---|---|
| 5,916,469 A * | 6/1999 | Scoles | B29C 65/5057 |
| | | | 219/603 |
| 5,939,013 A | 8/1999 | Han et al. | |
| 6,495,088 B1 | 12/2002 | Coffin et al. | |
| 6,723,273 B2 | 4/2004 | Johnson et al. | |
| 6,869,561 B2 | 3/2005 | Johnson et al. | |
| 7,014,809 B2 | 3/2006 | Audette | |
| 7,201,861 B2 * | 4/2007 | Filleul | B29C 70/48 |
| | | | 264/102 |
| 7,797,075 B1 | 9/2010 | Zhang et al. | |
| 7,892,467 B2 | 2/2011 | Kofoed et al. | |
| 8,221,666 B2 | 7/2012 | Mikkelsen et al. | |
| 8,628,717 B2 | 1/2014 | Pook et al. | |
| 8,652,371 B2 * | 2/2014 | Smith | B29C 43/3642 |
| | | | 264/101 |
| 8,916,073 B2 | 12/2014 | Rydin et al. | |
| 8,940,213 B2 | 1/2015 | Lockett et al. | |
| 8,945,321 B2 | 2/2015 | Hanks et al. | |
| 9,114,576 B2 | 8/2015 | Bolick et al. | |
| 2005/0023712 A1 * | 2/2005 | Backhouse | B29C 70/546 |
| | | | 264/40.4 |
| 2005/0086916 A1 * | 4/2005 | Caron | B29C 43/12 |
| | | | 55/382 |
| 2006/0125155 A1 * | 6/2006 | Sekido | B29C 70/548 |
| | | | 264/511 |
| 2008/0106007 A1 | 5/2008 | Kipp et al. | |
| 2008/0182054 A1 | 7/2008 | Ridges et al. | |
| 2009/0165945 A1 | 7/2009 | Molligan | |
| 2010/0086765 A1 | 4/2010 | Inston | |
| 2011/0297308 A1 | 12/2011 | Makin et al. | |
| 2012/0175824 A1 | 7/2012 | Fergusson | |
| 2012/0289109 A1 | 11/2012 | Gohier et al. | |
| 2013/0175723 A1 * | 7/2013 | Luebbering | B29B 11/16 |
| | | | 264/39 |
| 2013/0264751 A1 | 10/2013 | Lockett et al. | |
| 2014/0191434 A1 | 7/2014 | Rydin et al. | |
| 2014/0327187 A1 | 11/2014 | Hurdle | |
| 2014/0327190 A1 | 11/2014 | Ballow | |
| 2015/0083321 A1 | 3/2015 | Yuodelis | |
| 2015/0102535 A1 | 4/2015 | Lutz | |
| 2016/0158971 A1 * | 6/2016 | Bernt | B29C 33/58 |
| | | | 264/511 |
| 2016/0214329 A1 | 7/2016 | Fernandes et al. | |

FOREIGN PATENT DOCUMENTS

| | | | | |
|---|---|---|---|---|
| CA | 2679111 C | 1/2013 | | |
| CA | 2897381 A1 | 5/2013 | | |
| CA | 2751940 C | 4/2014 | | |
| CA | 2772345 C | 3/2015 | | |
| CA | 2923891 A1 | 3/2015 | | |
| CA | 2643484 C | 6/2015 | | |
| EP | 2134523 A1 | 12/2009 | | |
| EP | 1996389 B1 | 2/2010 | | |
| EP | 2117819 B1 | 8/2011 | | |
| EP | 2477801 A1 | 7/2012 | | |
| EP | 2160287 B1 | 11/2012 | | |
| EP | 2749401 A2 | 7/2014 | | |
| EP | 2585287 B1 | 10/2014 | | |
| EP | 2529921 B1 | 10/2015 | | |
| WO | WO-2011030169 A1 * | 3/2011 | ......... | B29C 43/3642 |
| WO | WO2015036940 A1 | 3/2015 | | |
| WO | WO2015136157 A1 | 9/2015 | | |

OTHER PUBLICATIONS

Office Action in related Canadian Patent Application No. 2,942,015, dated Nov. 8, 2017, 4 pages.
Sara Black, Reusable Vacuum Membranes: Coming of Age?, CompositesWorld, Nov. 30, 2013, 8 pages.

* cited by examiner

METHOD OF FORMING PRESSURE PAD OR OTHER FLEXIBLE ELEMENT FOR USE DURING CURE OF COMPOSITE MATERIALS

CROSS-REFERENCE TO RELATED APPLICATIONS

This application claims the benefit of provisional U.S. Patent Application Ser. No. 62/218,286 filed Sep. 14, 2015, the entire contents of which are incorporated by reference herein.

FIELD OF THE INVENTION

The application generally relates to the manufacture of composite structures and, more particularly, to the manufacture of pressure pads and other flexible elements used during the cure of composite structures.

BACKGROUND OF THE INVENTION

Composite part manufacturing may include the use of a vacuum bagging process to apply compaction pressure on the composite material during cure. Vacuum bagging over complex surface can lead to insufficient pressure applied in tight corners due to the vacuum bag not conforming to the part surface, a non-uniform pressure distribution over smaller complex features, and/or rupture of the bagging material in contact with sharp tool features or when it is not directly supported.

Although pressure pads may be used over critical areas, these pads are typically made of cast material formed in a cast distinct from the composite mold or part. Reusable vacuum bags can be made of similar materials, which are typically sprayed on the mold surface or formed from sheets of uncured material which are placed on the mold and assembled together. These methods of manufacturing pressure pads and reusable vacuum bags may however be complex and/or necessitate the use of costly equipment.

SUMMARY OF THE INVENTION

In one aspect, there is provided a method of manufacturing a pressure pad configured for pressing against composite material received on a mold surface of a mold during cure, the method comprising: placing a porous material over the mold surface; forming a sealed enclosure containing the mold surface and the porous material; with the sealed enclosure under vacuum, infusing a curable liquid material into the enclosure and through the porous material; curing the liquid material under vacuum to form the pressure pad; and opening the enclosure and disengaging the pressure pad from the mold.

In another aspect, there is provided a method of manufacturing a flexible element configured for pressing against composite material received on a mold surface of a mold during cure, the method comprising: placing a porous material over the mold surface; placing the mold and the porous material in a sealed enclosure under vacuum; infusing silicone in liquid form into the enclosure through the porous material; curing the silicone in the sealed enclosure under vacuum to form the flexible element with the porous material being embedded therein; and disengaging the flexible element from the sealed enclosure and from the mold.

BRIEF DESCRIPTION OF THE DRAWINGS

Reference is now made to the accompanying figures in which.

DETAILED DESCRIPTION

Illustrative embodiments of the methods and apparatuses are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
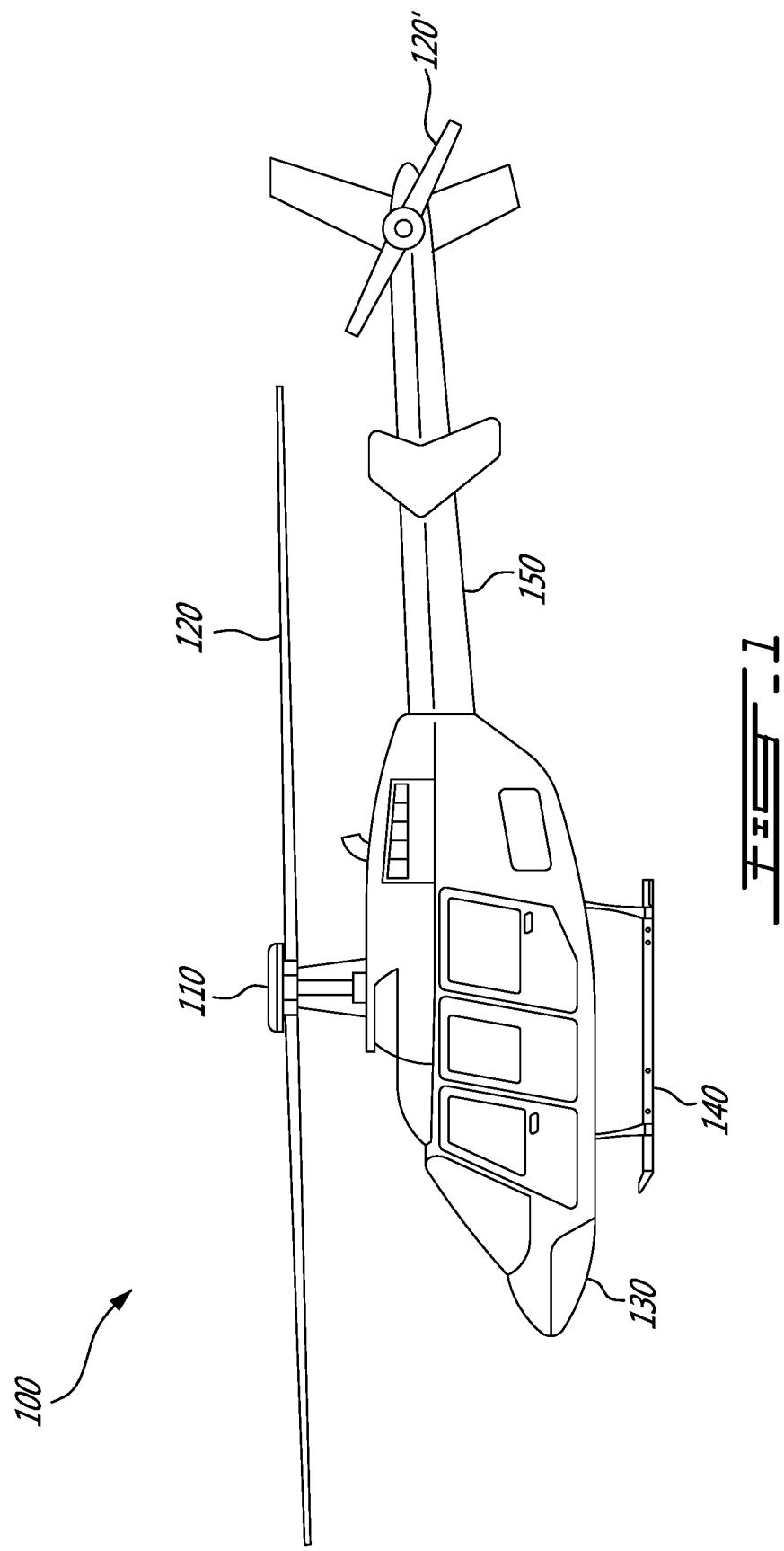
FIG. 1 is a schematic side view of a rotorcraft in accordance with a particular embodiment.

FIG. 1 shows a rotorcraft 100 according to one example embodiment. Rotorcraft 100 features a rotor system 110, blades 120, 120', a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120.

The present disclosure provides for a method of manufacturing a pressure pad or other flexible element (e.g. reusable vacuum bag, bladder) configured for applying pressure on a composite material which is received on a mold surface of a mold during its cure cycle, where the pressure pad or other flexible element is manufactured through direct infusion of a curable liquid material on the mold surface without the need for the fabrication of a casting tool. In a particular embodiment, the pressure pad or flexible element is used in the manufacture of composite components for the rotorcraft 100, for example, all or portion(s) of blades 120, 120', fuselage 130 and/or empennage 150. It should also be appreciated that the pressure pad or flexible element may alternatively be used in the manufacture of other components of the rotorcraft 100 as well as in the manufacture of any other suitable type of component, including but not limited to, components of other types of aircraft (e.g. airplanes and unmanned aircraft) and components of other types of vehicles (e.g. marine vehicles, recreation crafts, aerospace structure, automotive vehicles, recreational crafts, etc.).

Figure 2:
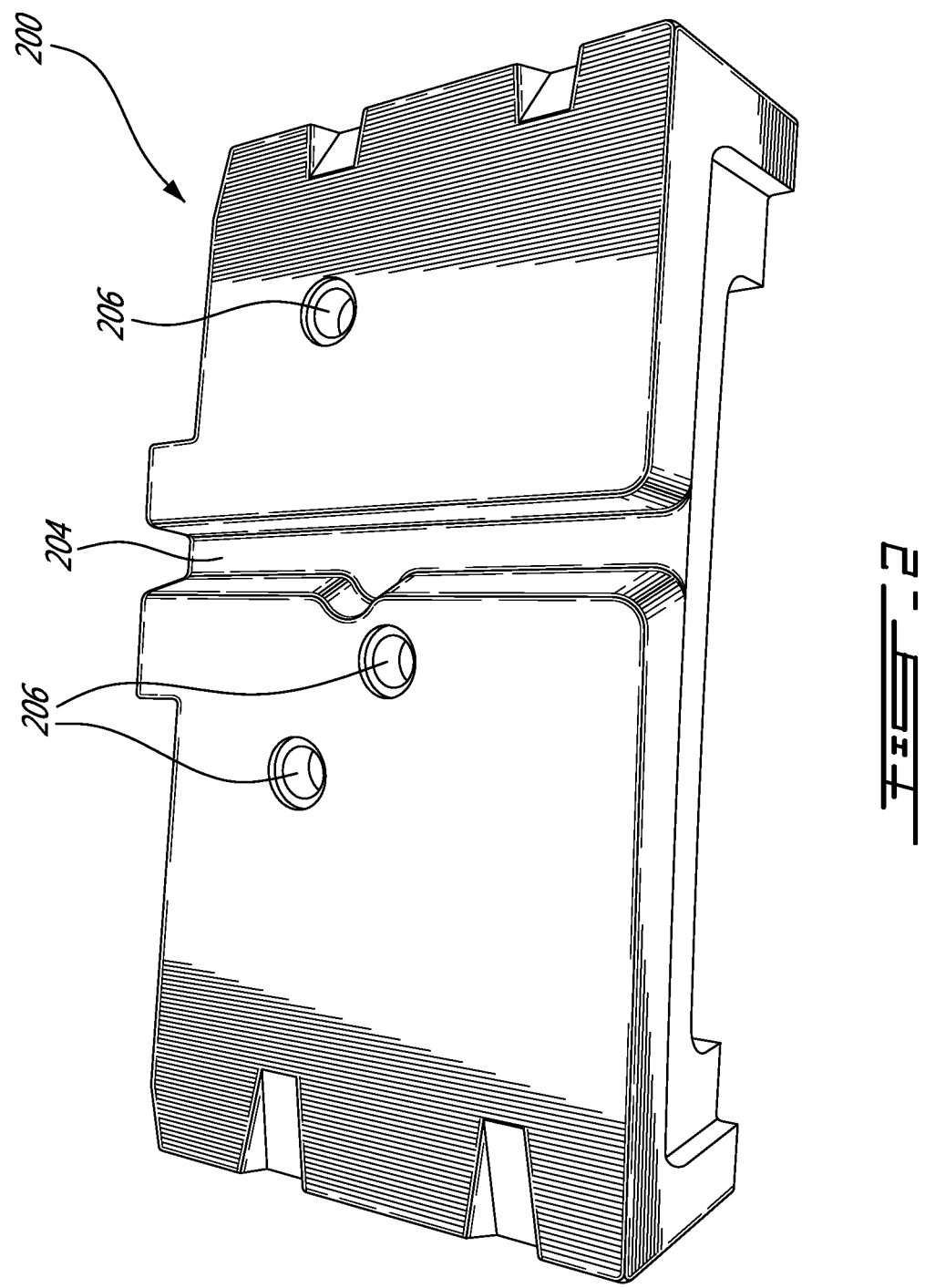
FIG. 2 is a schematic tridimensional view of a pressure pad in accordance with a particular embodiment, which may be used in the molding of a composite component of a rotorcraft such as shown in FIG. 1.
Figure 3:
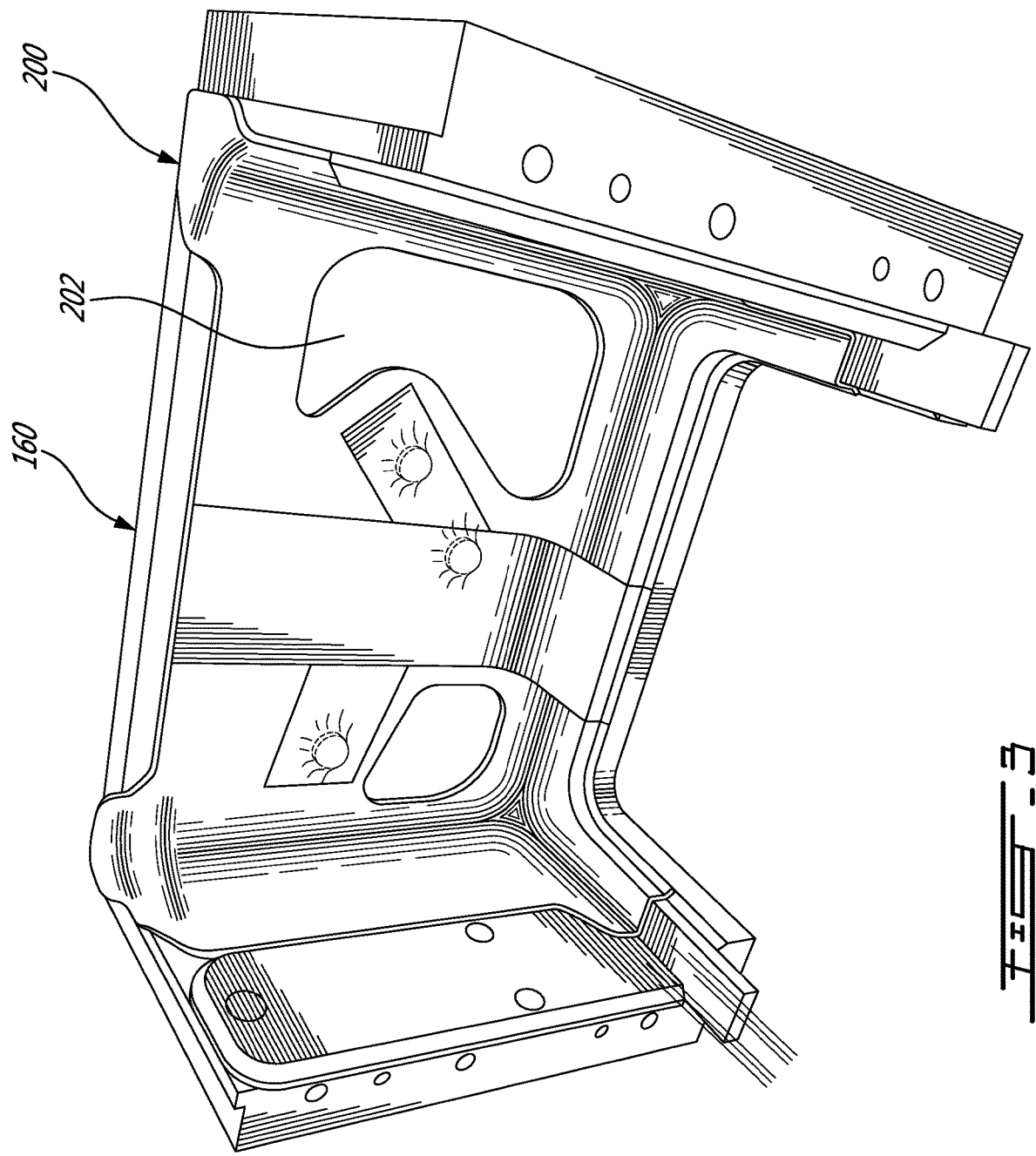
FIG. 3 is a schematic tridimensional view of the pressure pad of FIG. 2 engaged to a corresponding mold surface configured for molding the composite component.

Referring to FIGS. 2-3, a pressure pad 200 in accordance with a particular embodiment is shown; in FIG. 3, the pressure pad 200 is shown in engagement with the corresponding mold surface 202. As can be best seen in FIG. 2, the pressure pad 200 has a shape complementary to that of a part or a whole of the mold surface 202. For instance, in the example of FIG. 2, elongated recesses 204 each engage a respective ridge of the mold 160 (FIG. 3), as shown. The pressure pad 200 also includes smaller circular recesses 206 complementary to protruding elements of the mold 160, which may be, for example, screw or bolt heads, as shown.

In use, the pressure pad 200 is configured to overlay the composite material placed on the mold surface 202, for example, by being placed in direct contact with the composite material, and to be contained in the same sealed enclosure as the composite material during cure. The pressure pad 200 distributes the pressure applied on the composite material during cure (e.g., autoclave pressure combined with pressure applied through vacuum in the enclosure). In the embodiment shown, the pressure pad 200 also covers critical areas (e.g., protruding and/or sharp elements) of the mold 160 to prevent their contact with the bagging material forming the sealed enclosure during cure of the composite material, in order to prevent or reduce the risk of tearing the bagging material, which otherwise may be caused by these elements.

It is understood that in use, additional breather material and/or release film(s) may be provided in the sealed enclosure together with the pressure pad 200 and composite material during cure of the composite material, as required.

Figure 4:
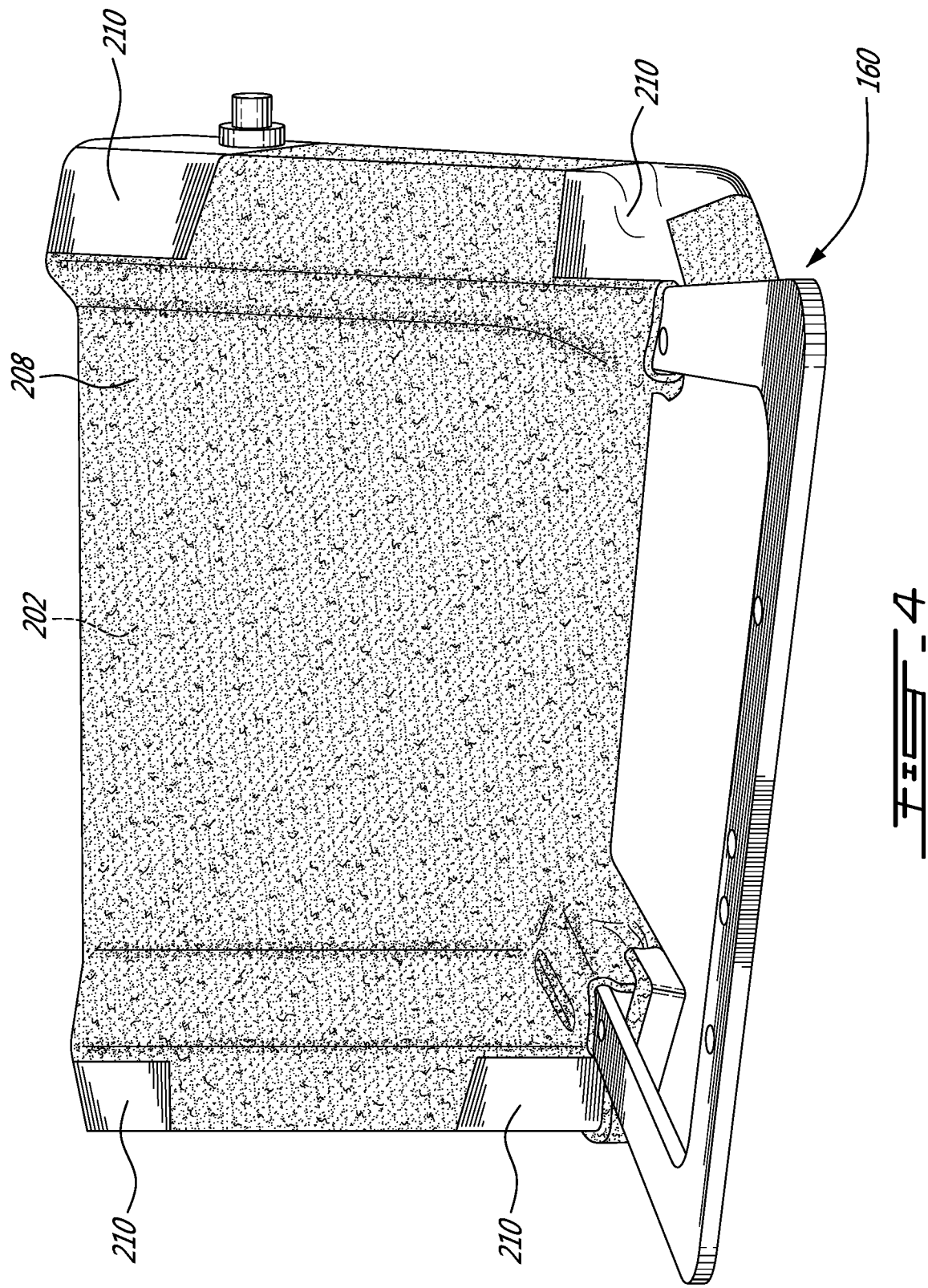
FIGS. 4-7 are schematic tridimensional views of different steps in the manufacture of the pressure pad of FIG. 2, in accordance with a particular embodiment.

Referring to FIGS. 4-7, in a particular embodiment, the pressure pad 200 is manufactured in accordance with the following. As shown in FIG. 4, a layer of porous material 208 is placed over the mold surface 202. In the embodiment shown, the porous material 208 completely covers the mold surface 202; other configurations are also possible. It is understood that the mold surface 202 is suitably configured, for example, through prior application of a release agent, so that the pressure pad 200 can be disengaged therefrom once cured. The mold surface 202 is the same mold surface 202 that will be used to cure the composite material; accordingly, the pressure pad 200 is formed to conform to the mold 160 with which it will be used.

In a particular embodiment, the porous material 208 is shaped under vacuum, for example, by forming a sealed enclosure with bagging material around the porous material 208 and the mold surface 202 and creating vacuum in this sealed enclosure.

In a particular embodiment, the mold 160 includes critical features which would be, in the absence of a pressure pad, susceptible to lead to insufficient pressure and/or damage to the bagging material when subjected to the pressure and temperature of the cure cycle of the composite material (e.g. corners, recesses, protruding elements such as fastener heads, sharp elements such as fastener heads and sharp edges, etc.). The porous material 208 is placed with portions thereof overlaying such critical features, and spaced from the underlying critical feature. The porous material 208 is removably connected to the mold 160, for example, using tape 210, so as to maintain these portions of the porous material 208 spaced apart from the respective critical feature when the porous material 208 is placed under vacuum, as will be further detailed below. This allows the porous material 208 to "bridge" over the critical features of the mold 160, creating cavities or corners under the porous material 208 containing these features.

The porous material 208 can be any material suitable to be used as a breather material during the cure of the composite material; the porous material 208 allows circulation of air therethrough to facilitate the application of vacuum, and is resistant to the temperatures used during cure of the composite material. In a particular embodiment, the porous material is a polyester breather fabric. Other suitable porous materials can, alternatively, be used.

Figure 5:
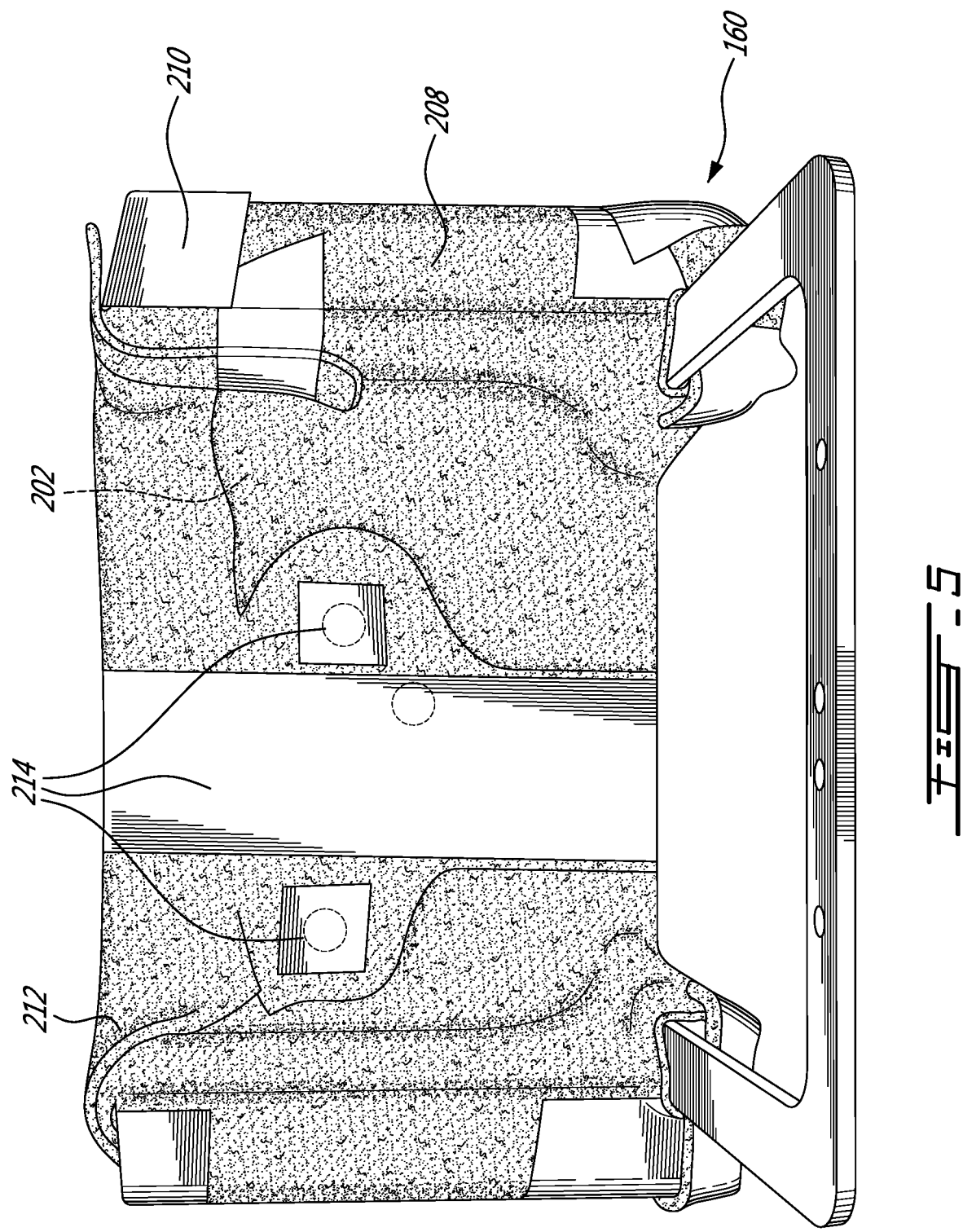

Referring to FIG. 5, once the porous material 208 has been shaped under vacuum and the enclosure formed for the vacuum shaping has been removed, one or more pieces of additional porous material 212 are placed over the first layer of porous material 208 to overlap predetermined areas of the mold surface 202 and/or of the rest of the mold 160. For example, the additional porous material 212 is placed over the critical features requiring increased support and/or protection against tearing of the bagging material that will be used during cure of the composite material. Accordingly, in the embodiment shown, the additional porous material 212 is positioned over sharp edges and screw or bolt heads. The additional porous material 212 may be made of the same material as the first layer of porous material 208.

A protective material 214 more tear resistant than the porous material 208, 212 is additionally placed over the layers of porous material 208, 212 to overlap some or all of the critical features (e.g. protruding and/or sharp elements) of the mold 160, for example, the elements more susceptible of tearing the bagging material that will be used during cure of the composite material. In the embodiment shown, the protective material 214 is placed over the screw or bolt heads and some of the sharp edges. In a particular embodiment, the protective material 214 is a polytetrafluoroethylene (Teflon®) tape. Other suitable materials can alternately be used.

It is understood that the additional porous material 212 and/or the protective material 214 may be omitted if the initial layer of porous material 208 provides for sufficient protection against tearing of the bagging material that will be used during cure of the composite material. Although not shown, additional reinforcements may be placed on the mold surface 202 or on the porous material 208, 212 so as to be integrated in the pressure pad 200.

Figure 6:
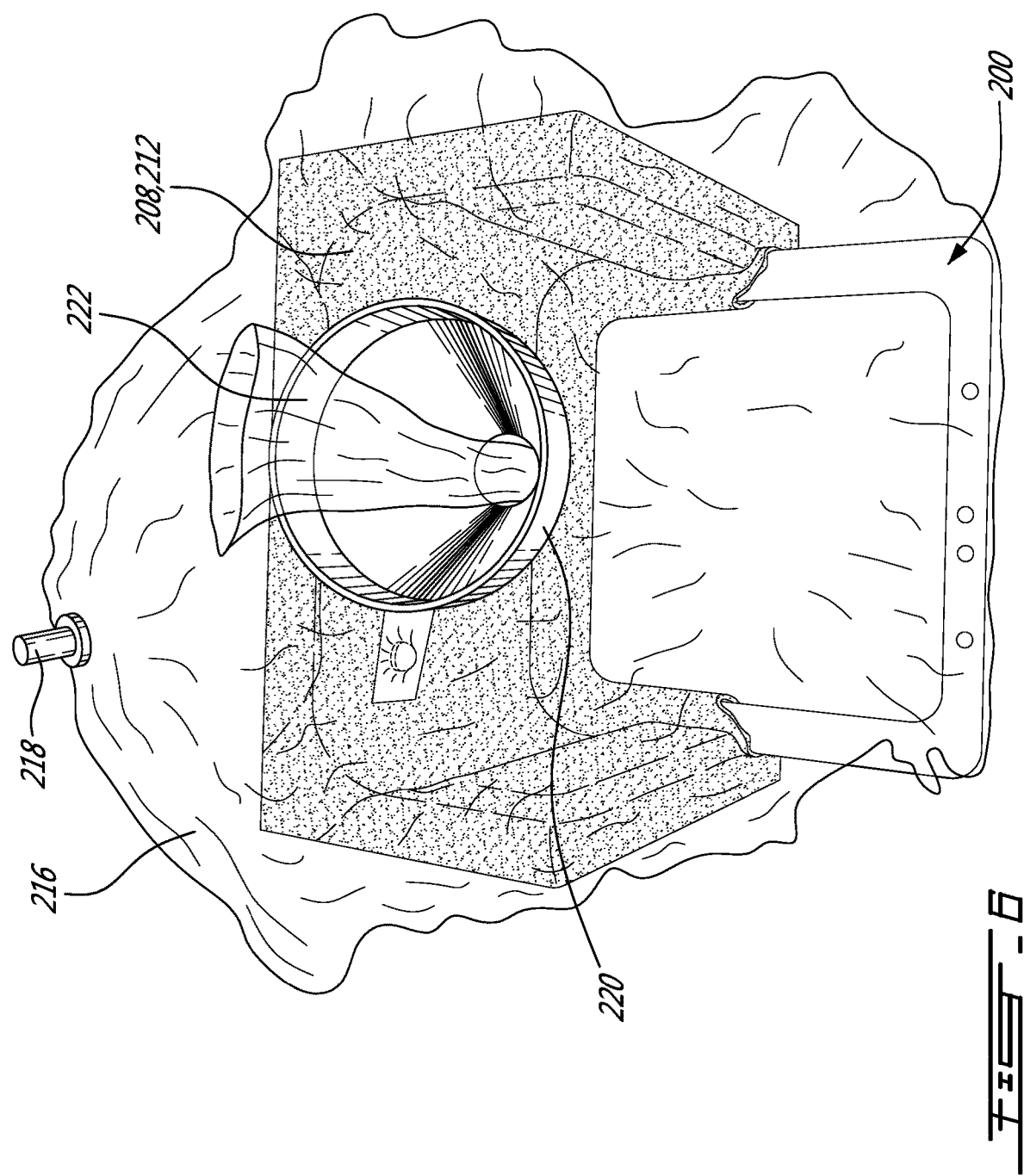
Figure 7:
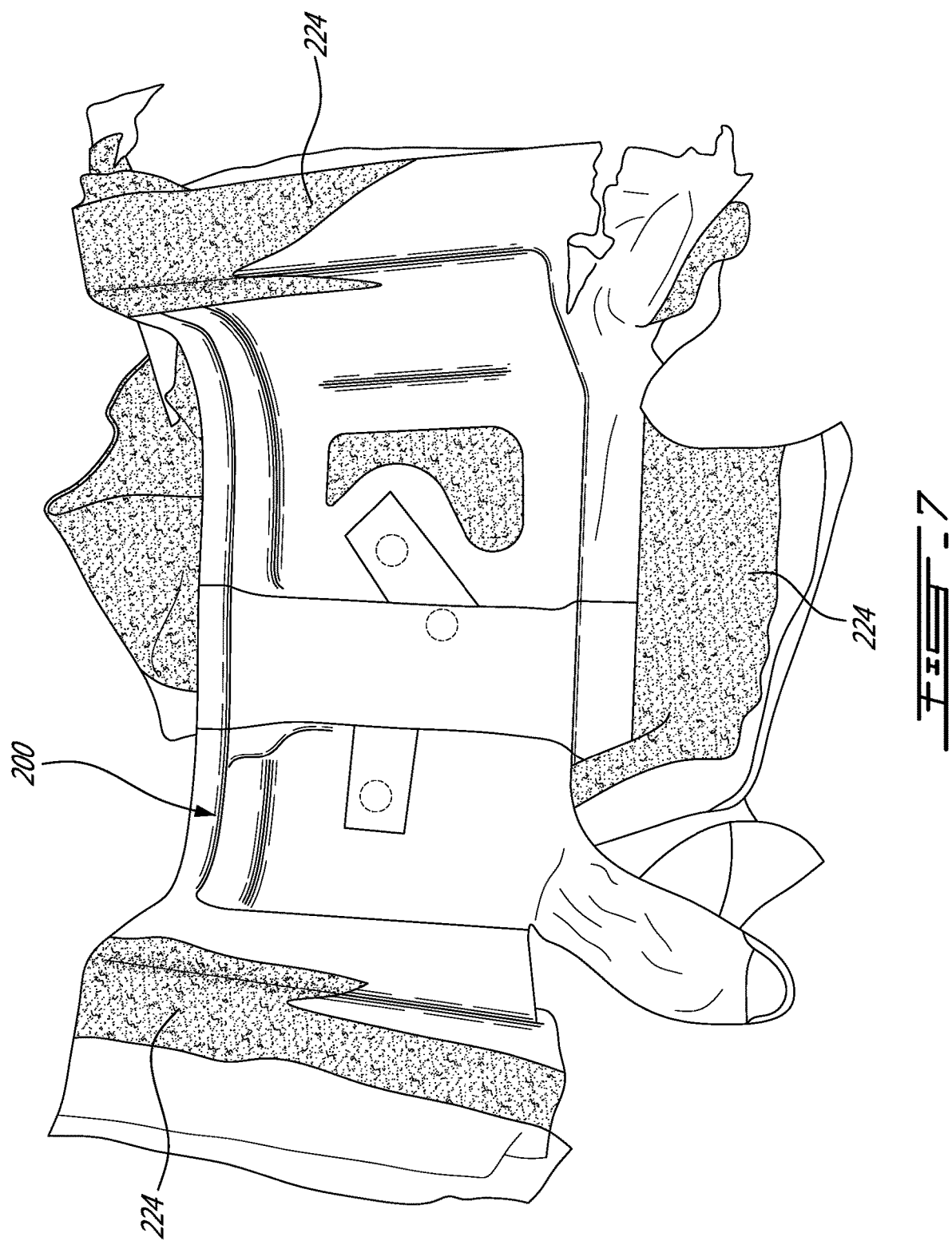

Referring to FIG. 6, once all the material to be integrated in the pressure pad 200 is in place, a sealed enclosure 216 is formed to contain the mold surface 202 and the porous material 208, 212 (and protective material 214 and additional reinforcements if present). In the embodiment shown, the enclosure 216 is formed with bagging material of the same type that will be used during cure of the composite material, and sealed using tacky sealant material of the same type that will be used to form the enclosure 216 for curing the composite material; accordingly, manufacture of the pressure pad 200 can be done using supplies already stocked for use in composite curing. Alternatively, any other suitable type of bagging material and/or sealant may be used.

In the embodiment shown, the enclosure 216 is formed as a "free" bag, containing the complete mold 160 and not connected thereto so as to be free to move with respect to the mold 160. Other configurations can alternatively be used.

A vent 218 is provided in communication with the enclosure 216, and the enclosure 216 is placed under vacuum through the vent 218. An inlet 220 is also provided in communication with the enclosure 216, through which a curable liquid material is infused into the enclosure 216 to form the pressure pad 200. The liquid material is infused through the porous material 208, 212, thus integrating the porous material 208, 212 into the pressure pad 200. In a particular embodiment, the liquid material conforms to the mold surface 202 so that the pressure pad 200 will be complementary to the mold surface 202 once formed.

In embodiments where portions of the porous material 208 are retained spaced from the mold 160, such as to create cavities under the porous material 208 over critical features, the porous material 208 provides support over the critical features of the mold 160 for the bagging material forming the sealed enclosure 216 to enable better bridging of the bagging material during the infusion process. The porous material 208 also acts as a flow media for the liquid material during infusion so that the liquid material can propagate and be infused beyond the cavities. The pressure pad 200 can have the shape needed to support bagging material over these critical features during composite curing.

In the embodiment shown, the liquid material is prepared in a separate bag 222 (for example made of the same material as the bagging material of the enclosure 216) and this bag 222 is connected to the inlet 220 of the enclosure 216, with an end of the bag 222 opposite the connection with the enclosure 216 remaining open. Accordingly, the vacuum applied to the enclosure 216 "pulls" the liquid material from its bag 222 into the enclosure 216 to create the infusion process. Once the infusion is performed, the open end of the bag 222 is sealed to maintain the vacuum within the enclosure 216.

The vacuum level within the enclosure 216 can be adjusted during the infusion, for example, by using an adjustable venturi or vacuum regulator between the vacuum source and the enclosure 216.

The liquid material is then cured in the sealed enclosure 216 under vacuum so as to form the pressure pad 200 with the porous material 208, 212 and protective material 214 (if used) being embedded therein. In a particular embodiment, the liquid material is a silicone curable at ambient temperature, for example, TC 5045 A/B. Accordingly, cure is performed at ambient temperature, for example, for a duration of 24 hours. Different cure temperatures and/or durations may be used depending on the curable liquid material selected to form the pressure pad 200. The liquid material is selected so as to be suitable for use, after cure, at the temperatures and pressures of the composite material cure cycle, and to be compatible with the particular composite material it will be used with. Materials other than silicone can, therefore, alternatively be used.

Once the material of the pressure pad 200 is cured, the enclosure 216 is opened and the pressure pad 200 is disengaged from the mold 160. In the embodiment shown and referring to FIG. 7, excess porous material 224 was disposed over the mold 160, and accordingly the excess material 224 (porous material, and optionally material of the pressure pad 200) is trimmed once the pressure pad 200 is disengaged from the mold 160.

In a particular embodiment, and in use, the pressure pad 200 manufactured according to the above method allows for a distribution of the autoclave pressure along the entire composite part while protecting the bagging material from tearing during the cure cycle of the composite part.

Figure 8:
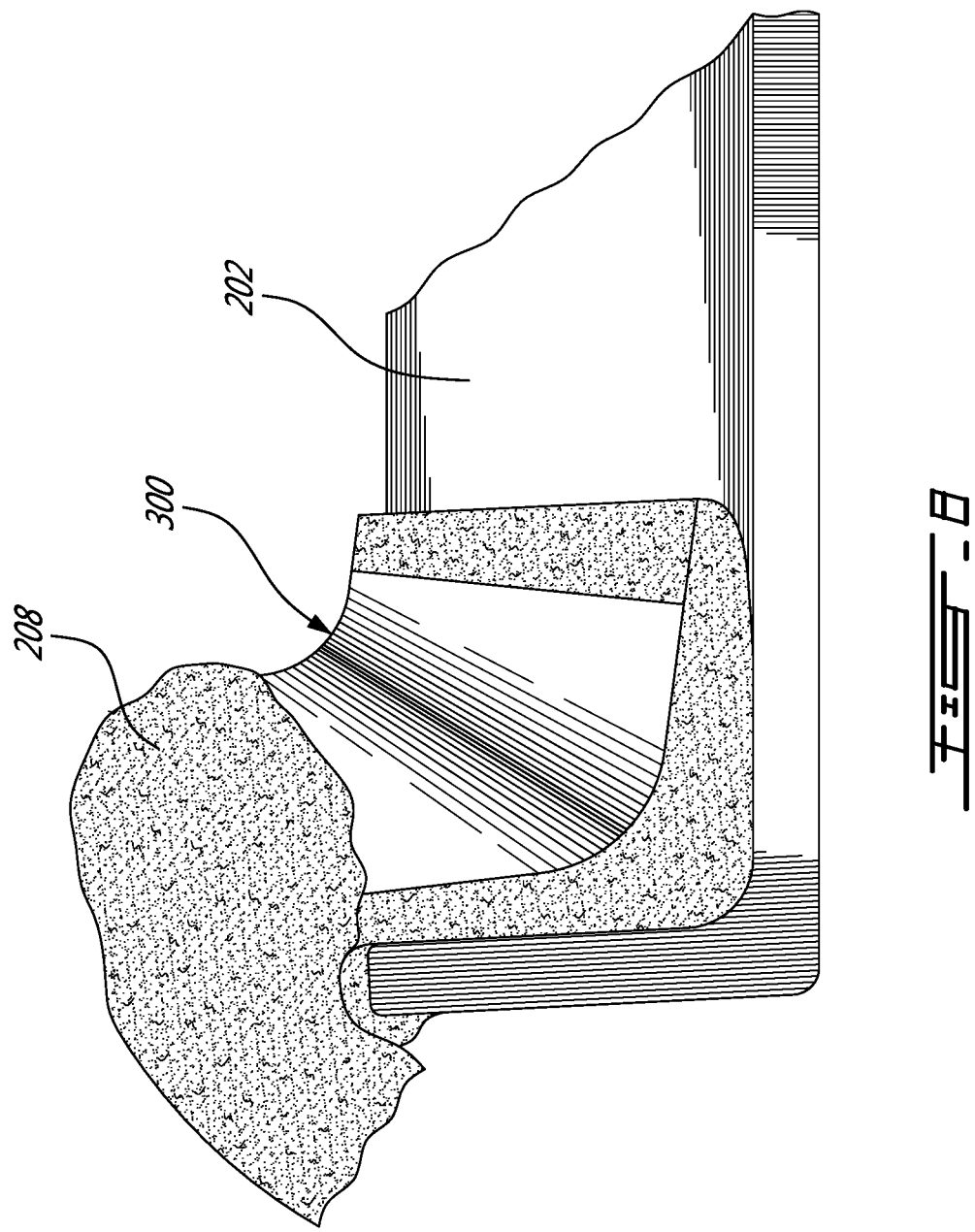
FIG. 8 is a schematic tridimensional view of a pressure pad in accordance with another particular embodiment, which may be used in the molding of a composite component of a rotorcraft such as shown in FIG. 1.

Referring to FIG. 8, a pressure pad 300 in accordance with another particular embodiment is shown. In this embodiment, the pressure pad 300 is smaller than the pressure pad 200 of FIGS. 2-3 and is configured to be complementary to only a corner portion of the mold surface 202. The additional porous material and protective material are omitted, but the pressure pad 300 may otherwise be manufactured in the same manner as that described above for the pressure pad 200 of FIGS. 2-3. It is understood that any other suitable configuration for a pressure pad 200, 300 can alternatively be used, configured to be complementary to only one, only some, or all of the elements of the mold surface 202, and optionally one or more additional elements of the mold 160. For example, separate pressure pads can be provided to overlay the different critical features of the mold 160.

In a particular embodiment, the porous material 208, 212 incorporated into the pressure pad 200, 300 provides for a reinforcement to strengthen the pressure pad 200, 300 and also stabilizes the material of the pressure pad 200, 300 (e.g. silicone), which may tend to shrink out of shape after being used in multiple composite curing cycles.

Figure 9:
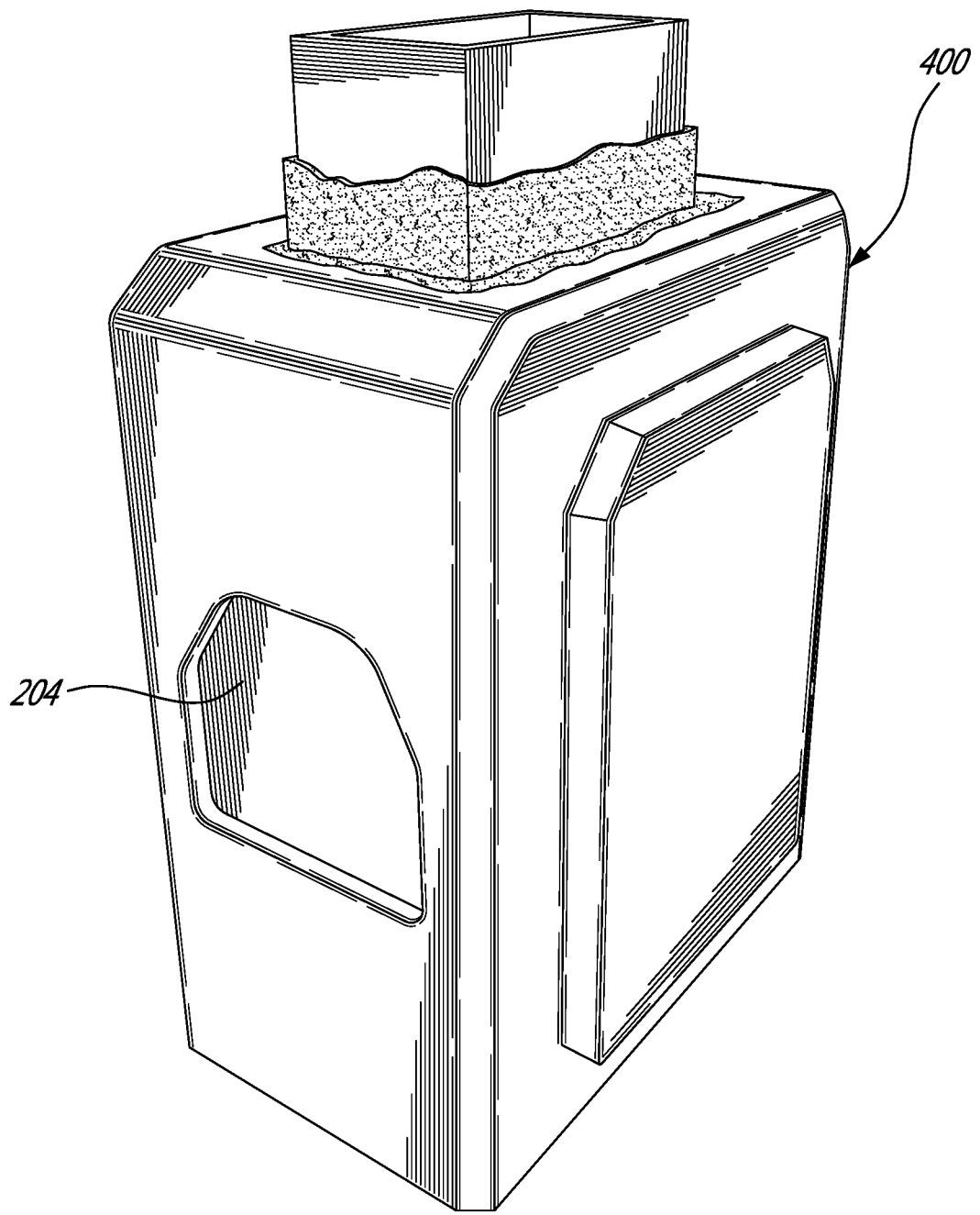
FIG. 9 is a schematic tridimensional view of a reusable vacuum bag in accordance with another particular embodiment, which may be used in the molding of a composite component of a rotorcraft such as shown in FIG. 1.
Figure 10:
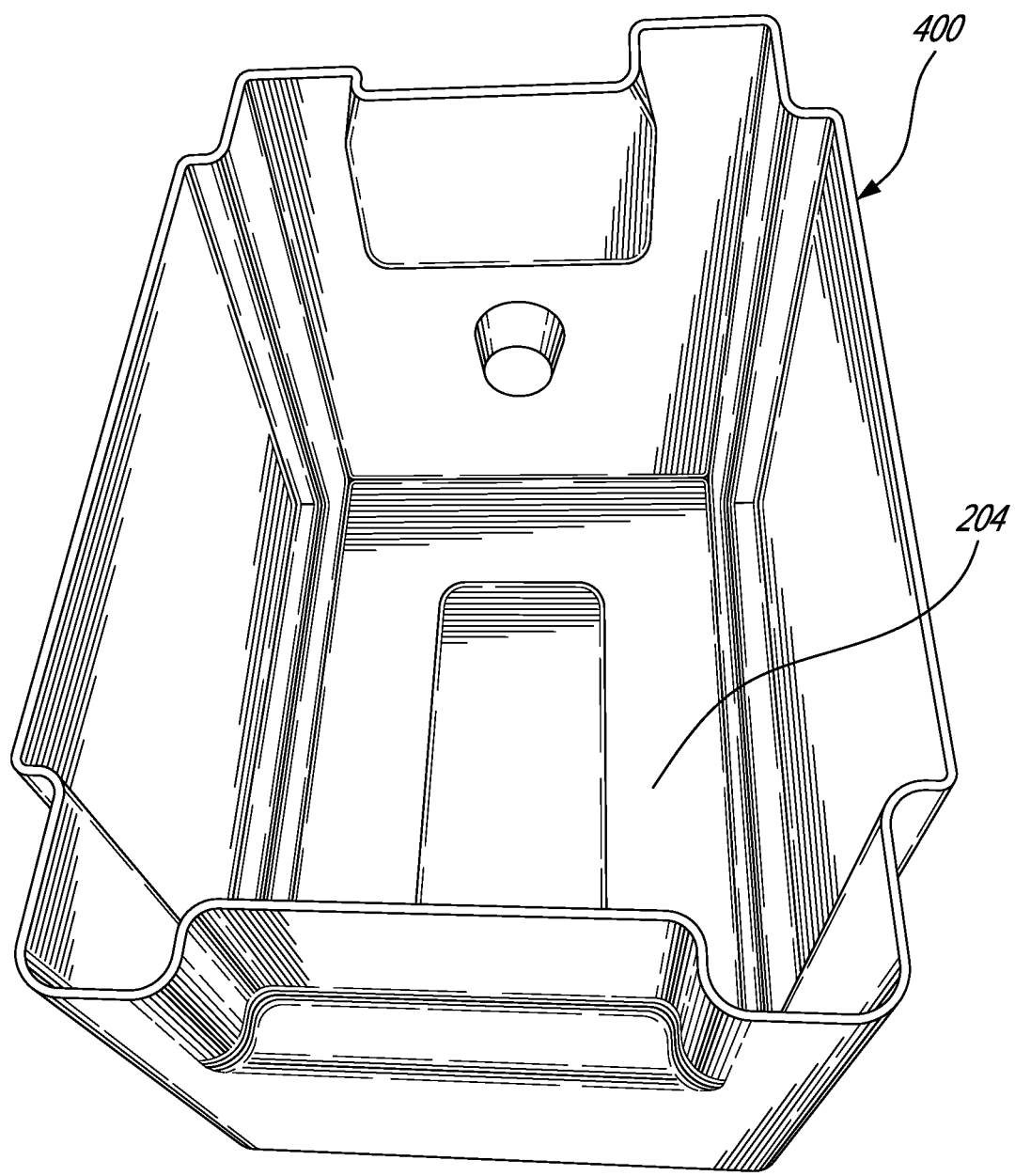
FIG. 10 is a schematic tridimensional view of a cut portion of the reusable vacuum bag of FIG. 9.

Referring to FIGS. 9-10, a flexible element 400 in accordance with another particular embodiment is shown, configured to be used as a reusable vacuum bag during the cure of composite material. The flexible element 400 may be used as bagging material and pressure pad at the same time, or alternatively, flexible element 400 may be used in combination with one or more separate pressure pad(s). The flexible element 400 is configured so as to be able to define a sealed enclosure around the composite material being cured. The flexible element 400 may be manufactured in the same manner as that described above for the pressure pad 200 of FIGS. 2-3, with or without additional porous material 212 and/or protective material 214.

Although not shown, the composite part molded on the mold surface 202 (whether in cured or uncured form) can be engaged to the mold surface 202 before manufacturing of the pressure pad 200, 300 or flexible element 400, so that the pressure pad 200, 300 or flexible element 400 is manufactured over the mold surface 202 while overlaying the composite part. In this embodiment, the infused liquid material conforms to the composite part so that the pressure pad 200 will be complementary to the composite part once formed. If required, the composite part is suitably configured, for example, through prior application of a release agent, so that the pressure pad 200 can be disengaged therefrom once cured.

In a particular embodiment, the infusion of the curable liquid material (e.g. silicone) directly onto the composite part or mold surface 202 and into the enclosure 216 formed by stretched bagging material allows the portions of the pressure pad 200, 300 or flexible element 400 overlaying the critical features of the mold 160 to be smoothed out to the desired pressure distribution contour.

It is understood that the described method may be used to form pressure pads and flexible elements such as reusable vacuum bags and bladders having any suitable configuration, and that the particular configurations shown herein are exemplary only.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of manufacturing a pressure pad configured for pressing against composite material received on a mold surface of a mold during cure, the method comprising:
   placing a porous material over the mold surface;
   forming a sealed enclosure containing the entire mold and the porous material, wherein a portion of the enclosure is movable relative to the mold surface when the sealed enclosure is under vacuum;
   connecting an open liquid material supply bag to an inlet of the sealed enclosure and with the sealed enclosure under vacuum, infusing a curable liquid material from the liquid material supply bag into the enclosure and through the porous material;
   after infusing the curable liquid material, closing the liquid material supply bag;
   curing the liquid material under vacuum to form the pressure pad; and
   opening the enclosure and disengaging the pressure pad from the mold;
   wherein the sealed enclosure comprises a free bag that is not connected to the mold.

2. The method according to claim 1, further comprising trimming excess material from the pressure pad after disengaging the pressure pad from the mold.

3. The method according to claim 1, wherein the porous material is placed with at least a portion thereof spaced apart from the mold so as to define a cavity between the mold and the portion of the porous material, and wherein placing the porous material includes removably connecting the porous material to the mold so that the portion remains spaced apart from the mold under vacuum.

4. The method according to claim 1, wherein the porous material is a first porous material, the method further comprising, before infusing the curable liquid material, placing at least one second porous material over the first porous material to overlap predetermined areas of the mold.

5. The method according to claim 4, wherein the first porous material is shaped under vacuum against the mold surface before placing the at least one second porous material over the first porous material.

6. The method according to claim 1, further comprising, before forming the enclosure, placing a protective material on the porous material over selected features of the mold, the protective material being more tear resistant than the porous material.

7. The method according to claim 6, wherein the protective material is a polytetrafluoroethylene tape.

8. The method according to claim 1, wherein the liquid material is cured at ambient temperature.

9. The method according to claim 1, wherein the curable liquid material includes silicone.

10. The method according to claim 1, wherein the porous material includes a polyester breather fabric.

11. The method according to claim 1, further comprising adjusting a level of the vacuum during the infusion.

12. A method of manufacturing a flexible element configured for pressing against composite material received on a mold surface of a mold during cure, the method comprising:
    placing a porous material over the mold surface;
    placing the entire mold and the porous material in a sealed enclosure under vacuum, wherein a portion of the enclosure is movable relative to the mold surface when the sealed enclosure is under vacuum;
    connecting an open liquid material supply bag to an inlet of the sealed enclosure and infusing silicone in liquid form from the liquid material supply bag into the enclosure and through the porous material;
    after infusing the silicone, closing the liquid material supply bag;
    curing the silicone in the sealed enclosure under vacuum to form the flexible element with the porous material being embedded therein; and
    disengaging the flexible element from the sealed enclosure and from the mold;
    wherein the sealed enclosure comprises a free bag that is not connected to the mold.

13. The method according to claim 12, wherein the flexible element is shaped for use as bagging material during the cure of the composite material.

14. The method according to claim 12, wherein the flexible element is shaped for use as a pressure pad received inside a sealed enclosure also containing the composite material during the cure of the composite material.

15. The method according to claim 12, wherein the porous material is placed with at least a portion thereof spaced apart from the mold so as to define a cavity between the mold and the portion of the porous material, and wherein placing the porous material includes removably connecting the porous material to the mold so that the portion remains spaced apart from the mold under vacuum.

16. The method according to claim 12, wherein the porous material is a first porous material, the method further comprising, before infusing the curable liquid material, placing at least one second porous material over the first porous material to overlap predetermined areas of the mold.

17. The method according to claim 16, wherein the first porous material is shaped under vacuum against the mold surface before placing the at least one second porous material over the first porous material.

18. The method according to claim 12, further comprising, before forming the enclosure, placing a protective material on the porous material over selected features of the mold, the protective material being more tear resistant than the porous material.

19. The method according to claim 12, wherein the liquid material is cured at ambient temperature.

20. The method according to claim 12, wherein the porous material includes a polyester breather fabric.

* * * * *